United States Patent [19]

Klein

[11] Patent Number: 4,646,579

[45] Date of Patent: Mar. 3, 1987

[54] SHAFT SEAL ASSEMBLY

[75] Inventor: Johannes Klein, Bad Dürkheim, Fed. Rep. of Germany

[73] Assignee: Klein, Schanzlin & Becker Aktiengesellschaft, Frankenthal, Fed. Rep. of Germany

[21] Appl. No.: 796,014

[22] Filed: Nov. 7, 1985

[30] Foreign Application Priority Data

Nov. 7, 1984 [DE] Fed. Rep. of Germany ....... 3440605
Oct. 22, 1985 [DE] Fed. Rep. of Germany ....... 3537448

[51] Int. Cl.⁴ .............................................. F16J 15/50
[52] U.S. Cl. .................................... 74/18.1; 74/640; 74/805
[58] Field of Search ......................... 74/18.1, 640, 805

[56] References Cited

U.S. PATENT DOCUMENTS 1,436,444 11/1922 Holmes ............................. 74/18.1 X
2,100,014 11/1937 McCracken ..................... 74/18.1 X
2,137,303 11/1938 Nelson ................................. 74/18.1

FOREIGN PATENT DOCUMENTS

610828 10/1960 Italy ......................................... 74/18
826513 1/1960 United Kingdom ................. 74/18.1

Primary Examiner—Richard J. Scanlan, Jr.
Attorney, Agent, or Firm—Peter K. Kontler

[57] ABSTRACT

A shaft seal assembly wherein the end portions of two coaxial shafts carry two components of a torque transmitting unit. One component is a disc which is eccentrically secured to the end portion of the respective shaft and extends into an eccentric circular recess of the other component which is coaxially affixed to the end portion of the associated shaft. A cup-shaped sealing element is installed in the recess to separate the two components from each other, and its annular portion is sealingly affixed to one end portion of a bellows whose other end portion is sealingly secured to one end wall of a housing. The shaft which carries the one component is rotatably journalled in the one end wall and the other shaft is rotatably journalled in a second end wall of the housing. One or more antifriction radial or thrust bearings and/or one or more friction bearings can be interposed between the other component and the housing and/or between the cup-shaped element and the two components to reduce bending and/or axial stresses upon the shafts and/or torsional stresses which are transmitted to the bellows when one of the shafts rotates or performs oscillatory movements in order to transmit torque to the other shaft by way of the two components and due to the fact that the one component is eccentric with reference to and is received in the eccentric recess of the other component.

18 Claims, 8 Drawing Figures

Fig.8

SHAFT SEAL ASSEMBLY

BACKGROUND OF THE INVENTION

The present invention relates to improvements in motion transmitting assemblies, and more particularly to improvements in assemblies wherein a rotary driving member transmits torque to a rotary driven member. Still more particularly, the invention relates to improvements in assemblies wherein the driving and driven members must or should be hermetically sealed from each other. Typical examples of assemblies which can embody the present invention are shaft seals.

Shaft seals are necessary in certain types of pumps, valves, measuring apparatus, regulating apparatus and in many other systems wherein aggressive media must be confined and/or compelled to remain in a predetermined path or wherein the conveyed media must be shielded from the surrounding atmosphere. For example, it is often necessary to hermetically seal certain gaseous and/or liquid media from the surrounding area. Hermetic seals are invariably necessary when the driving and driven members are mounted in areas (e.g., in separate chambers or compartments) which must be maintained at different pressures, e.g., if the driving member is disposed in an area wherein the pressure matches or approximates atmospheric pressure but the driven member is to be confined in an evacuated chamber or compartment wherein the pressure is or should be well below atmospheric pressure.

German Offenlegungsschrift No. 15 50 699 discloses a vacuum-tight shaft seal wherein one end portion of the driven shaft is bent and is rotatably mounted in a thimble-like motion transmitting member which, in turn, is sealingly secured to a bellows and has a pin serving to transmit motion to a crank disc. The crank disc can cause the driven shaft to rotate by compelling the bent end portion of such shaft to orbit about the axis of the driven shaft. A drawback of the just described shaft seal is that it occupies a substantial amount of space as well as that the transmission of torque cannot take place without play which eliminates such seals from utilization under circumstances when the transmission of motion should be effected with a high or utmost degree of accuracy.

German Auslegeschrift No. 11 31 054 discloses an assembly which can transmit only oscillatory movements and wherein the adjoining end portions of two shafts have crank pins which are disposed opposite each other. A crank web between the two shafts has two blind bores each of which receives one of the pins. One end portion of a sealing device in the form of a bellows is sealingly secured to a housing and its other end portion is affixed to the web. During transmission of oscillatory motion, the web oscillates about the common axis of the two shafts. Studs which extend into complementary grooves of finite length confine the crank web to oscillatory movements of predetermined maximum amplitude. The Auslegeschrift mentions the possibility of replacing the grooves of finite length with endless annular grooves so as to allow for rotary movements of the shafts. However, the publication does not explain how such rotary movements can take place due to the fact that the movements of the shafts to certain angular positions (namely to the right-hand and left-hand dead end positions) apparently entail a tilting and resulting blocking, even if one disregards the unavoidable machining tolerances. Therefore, the Auslegeschrift further proposes to use a planetary transmission if the driven shaft is to receive an uninterrupted rotary motion. Such transmission enables the driver shaft to continuously transmit torque in a controlled manner.

A similar assembly is disclosed in German Pat. No. 12 33 668 wherein two slides are installed in straight grooves. In other respects, the patented assembly is identical with or clearly analogous to the assembly of the aforementioned Auslegeschrift.

OBJECTS AND SUMMARY OF THE INVENTION

An object of the invention is to provide a versatile motion transmitting assembly which can transmit incremental as well as continuous angular movements in a clockwise or counterclockwise direction while the driven and driving members remain hermetically sealed from each other.

Another object of the invention is to provide an assembly wherein the functions of the driving and driven members can be reversed and which can transmit pronounced or weak torques with the same degree of efficiency.

A further object of the invention is to provide a novel and improved shaft seal which is not only relatively simple, compact and inexpensive but which can also ensure the transmission of torque with a heretofore unprecedented degree of accuracy and reproducibility.

An additional object of the invention is to provide a novel and improved seal between the driving and driven members of a torque transmitting assembly.

Still another object of the invention is to provide a novel and improved method of sealing the driving member from the driven member in a shaft seal or a like assembly.

The invention resides in the provision of a motion transmitting assembly which can be used as a shaft seal and comprises a rotary driving member (e.g., a first shaft which is rotatable by hand or by a motor) having a preferably toothed or otherwise serrated end portion, a rotary driven member (e.g., a second shaft) which is coaxial with and has a preferably toothed or otherwise serrated end portion adjacent to the end portion of the driving member, and a torque transmitting unit including a first component which is affixed to one of the end portions (e.g., to the end portion of the driven member) and has a circular recess facing the other end portion and being eccentric with reference to the common axis of the driving and driven members, and a second component having a circular outline eccentrically affixed to the other end portion and extending into the recess. The assembly further comprises means for hermetically sealing the driving and driven members from each other, and such sealing means comprises a preferably cup-shaped or thimble-like element which is disposed in the recess intermediate the two components of the torque transmitting unit, a support (preferably a hollow housing having two end walls and a tubular portion between the end walls), and deformable carrier means secured to the support and sealingly connected with the cup-shaped element. The components of the torque transmitting unit are rotatable relative to the cup-shaped element and that component which is rigid with the end portion of the driving member transmits torque to the component which is rigid with the end portion of the driven member, due to eccentricity of the recess and of the second component, when the driving member is set in rotary motion.

The housing of the support preferably confines the torque transmitting unit as well as the cup-shaped element and carrier means of the sealing means, and the end portions of the driving and driven members are preferably rotatably journalled in the housing so that the improved assembly constitutes a self-contained unit.

The assembly preferably further comprises means for holding at least one of the driving and driven members against axial movement with reference to the support. Such holding means can be interposed between the support and at least one component of the torque transmitting unit. At least a portion of the holding means can constitute an integral part of the support.

The assembly can comprise at least one radial and/or at least one axial bearing which is interposed between the support and the torque transmitting unit. Such bearing or bearings preferably surround the first component of the torque transmitting unit. The bearing or bearings can be installed in or close to a plane which is normal to the common axis of the driving and driven members and wherein one component of the unit transmits torque to the other component when the driving member is set in rotary motion. The first component can be provided with a circumferentially extending annular collar which is spacedly surrounded by the housing of the support, and the radial and/or thrust bearing or bearings can be disposed around the first component adjacent to the collar.

The first component of the torque transmitting unit can be provided with a first smooth surface which is normal to the common axis of the driving and driven members, the second component can be provided with a second smooth surface which is parallel to and is slightly spaced apart from the first surface, and the cup-shaped element of the sealing means then comprises a wall which is disposed between the first and second surfaces. Alternatively, or in addition to such first and second smooth surfaces, the just mentioned wall of the cup-shaped element of the sealing means can have smooth first and second surfaces which are in sliding contact with the first and second components of the torque transmitting unit.

The driving and driven members can be journalled in the end walls of the housing of the support in such a way that their end portions are disposed in the housing. The carrier means can include a deformable tube (e.g., a bellows) one end portion of which is sealingly secured to one of the end walls and the other end portion of which is sealingly secured to the annular part of the cup-shaped element. The external teeth or similar serrations of the end portions of the driving and driven members preferably mate with complementary internal teeth or serrations of the respective components of the torque transmitting unit.

The novel features which are considered as characteristic of the invention are set forth in particular in the appended claims. The improved assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Referring first to FIGS. 1 to 5, there is shown a motion transmitting assembly which constitutes a self-contained shaft seal wherein a rotary driving member 6 in the form of a shaft is to transmit continuous or interrupted rotary motion to a rotary driven member 1 in the form of a shaft. The end portions 7, 12 of the shafts 6, 1 (which are coaxial with each other) are adjacent to one another and are provided with axially parallel teeth or with otherwise configured serrations for establishment of torque-transmitting or torque-receiving connections with the respective components 8, 11 of a torque transmitting unit 9 installed in the interior of a support constituting a housing having two spaced-apart end walls 2, 4 and a tubular portion 5 between the two end walls. The lower end of the tubular portion 5 can be welded or otherwise sealingly secured to the respective side of the end wall 2. The driven shaft 1 is rotatably journalled in the end wall 2 and its end portion 12 is located in the interior of the housing. The shaft 6 is rotatably journalled in the end wall 4 as well as in a sleeve-like extension 4a of the end wall 4, and its end portion 7 is also located in the housing close to the end portion 12 of the shaft 1. The common axis of the shafts 1 and 6 is shown at 13, and the means for transmitting torque to the shaft 6 can comprise a lever or a wheel (not shown), or a suitable motor 113. The motor 113 (or a transmission which is driven by the motor 113) can be coupled to the exposed end portion 7a of the shaft 6.

Figure 1:
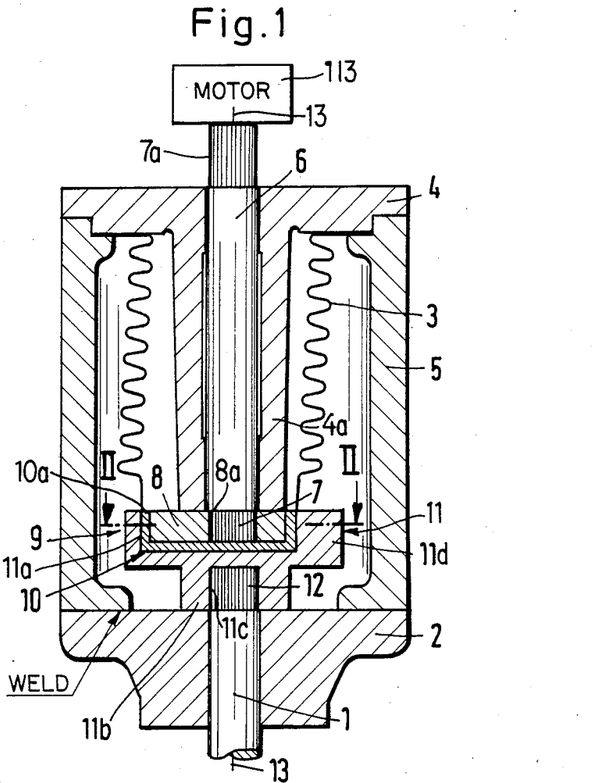
FIG. 1 is an axial sectional view of a shaft seal assembly which embodies one form of the invention and wherein the end portions of the driving and driven members have axially parallel teeth in mesh with complementary internal teeth of the respective components of the torque transmitting unit.

The sealing means of the improved assembly comprises a cup-shaped or thimble-like element 10 which surrounds the component 8 of the torque transmitting unit 9 and is received in a complementary recess 11a of the component 11. The sealing means further includes the housing (i.e., the support including the end walls 2, 4 and the tubular portion 5) as well as a deformable tube 3 which preferably constitutes a bellows having a first end portion sealingly secured to the housing and a second end portion sealingly secured to the annular portion 10a of the element 10. The first end portion of the bellows 3 is sealingly clamped between the marginal portion of the end wall 4 and the respective end face of the tubular portion 5 by a set of bolts or other suitable fasteners, not shown. Thus, the parts 4, 5 of the housing, the bellows 3 and the element 10 hermetically seal the end portion 7 of the driving shaft 6 from the end portion 12 of the driven shaft 1.

The component 8 of the torque transmitting unit 9 is a flat disc which has an eccentric bore or hole 8a for the end portion 7 of the shaft 6. The bore or hole 8a is bounded by a toothed or otherwise serrated internal surface so that the element 8 is compelled to share all (even the minutest) angular movements of the shaft 6 and vice versa. The element 11 has a hub 11b which is coaxial with the shafts 1, 6 and has an axial blind bore or hole 11c surrounded by a toothed or otherwise serrated surface and receiving the end portion 12 of the shaft 1 so that the parts 1 and 11 rotate as a unit.

The recess 11a has a circular outline and is eccentric with reference to the common axis 13 of the shafts 1 and 6. The eccentricity E of the component 8 matches that of the recess 11a. The components 8 and 11 are rotatable relative to the cup-shaped element 10 of the sealing means so that, when the shaft 6 is driven by the motor 113 to rotate the shaft 1 through the medium of the eccentrically mounted component 8 and the other component 11 of the torque transmitting unit 9, the inclination of the axis of the bellows 3 changes in dependency on the angular position of the component 8 with reference to the element 10. The hub 11b of the component 11 abuts against the inner side of the end wall 2 so that the shaft 1 is held against axial movement in a direction away from the shaft 6, and the component 8 abuts against the end face of the extension 4a so that the shaft 6 is held against axial movement in a direction away from the shaft 1.

The larger-diameter (recessed) portion 11d of the component 11 is coaxial with the shafts 1 and 6, the same as the hub 11b. The position of that end portion of the bellows 3 which is sealingly secured to the end wall 4 and tubular portion 5 of the housing remains unchanged when the assembly of FIGS. 1 to 5 is in actual use. However, the other end portion of the bellows 3 and the element 10 sway about the axis 13 when the shaft 6 is driven to rotate the shaft 1 in a clockwise or in a counterclockwise direction due to eccentric mounting of the component 8 on the end portion 7 of the shaft 6. The shaft 6 can perform a continuous clockwise or counterclockwise angular movement, it can oscillate back and forth through identical or different angles, or it can turn incrementally in a single direction (clockwise or counterclockwise). It is clear that the shaft 1 can drive the shaft 6 through the medium of the torque transmitting unit 9.

The teeth on the end portions 12, 7 of the shafts 1, 6 and the complementary internal teeth of the components 11 and 8 can be replaced with otherwise configurated means for compelling the components of the torque transmitting unit 9 to share the angular movements of the respective shafts. For example, the connections can be established by means of keys, diametrically extending pins or the like. Furthermore, the component 8 and/or 11 can constitute an integral part of the respective shaft. The bellows 3 can be replaced with other suitable carrier means for establishing a hermetic seal between the annular portion 10a of the element 10 and the support including the housing 2, 4, 5. The bellows 3 is subjected to minimal or negligible torsional stresses, namely only to those which develop as a result of frictional contact between the element 10 and the components 8, 11 of the unit 9.

Figure 2:
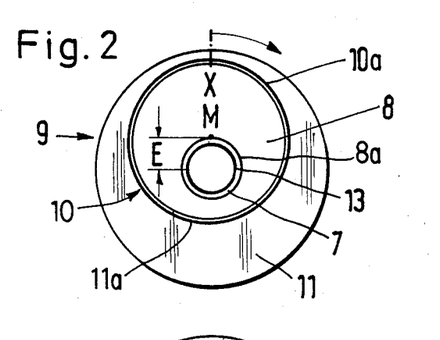
FIG. 2 is a fragmentary transverse sectional view, as seen in the direction of arrows from the line II—II of FIG. 1, and shows the two components of the torque transmitting unit in first positions relative to each other at the start or upon completion of a full revolution of the driving member.
Figure 3:
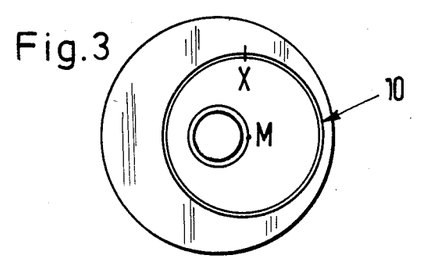
FIG. 3 shows the structure of FIG. 2 with the components in mutual positions they assume upon rotation of the driving member through 90 degrees from the angular position of FIG. 2.
Figure 4:
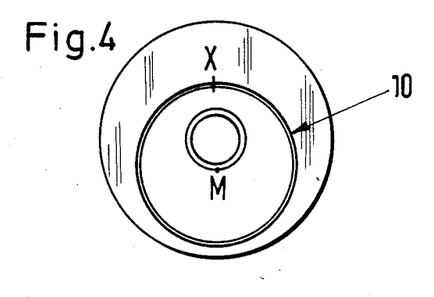
FIG. 4 shows the structure of FIG. 2 but with the two components in mutual positions they assume after the driving member has completed an angular movement through 180 degrees.
Figure 5:
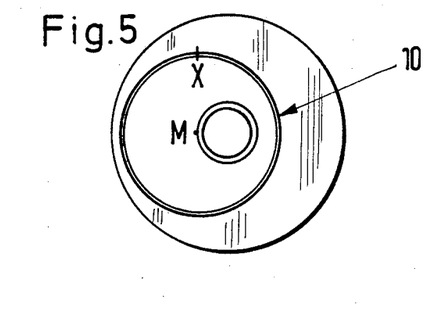
FIG. 5 shows the same structure but with the components in mutual positions they assume after the driving member has completed an angular movement through 270 degrees.

FIG. 2 shows the eccentricity E of the component 8 and recess 11a with reference to the common axis 13 of the shafts 1 and 6. The character X denotes a selected point on the annular portion 10a of the cup-shaped element 10, and it will be seen that the angular position of such point with reference to the center M of the component 8 and recess 11a remains unchanged regardless of the angular position of the end portion 7 of the shaft 6, i.e., the element 10 moves from the position of FIG. 2 to the position of FIG. 3 without any angular displacement while the shaft 6 completes an angular movement through 90 degrees (clockwise, as viewed in FIG. 2), the element 10 then moves to the position of FIG. 4 while the shaft 6 completes an additional angular movement through 90 degrees, and the element 10 assumes the position of FIG. 5 after the shaft 6 completes an angular movement through 270 degrees. The element 10 reassumes the position of FIG. 2 when the shaft 6 completes a full revolution. The point X on the annular portion 10a of the element 10 travels along a circular path whose diameter equals 2E. As mentioned above, the position of the point X with reference to the common center M of the component 8, element 10 and recess 11a remains unchanged irrespective of the angular position of the shaft 6. The eccentricity E of the component 8 and recess 11a is selected in dependency on the availability of space in the housing of the support and/or on the material and shape of the carrier means (bellows 3).

The internal surface of the end wall 2 and the end face of the extension 4a constitute a means for holding the shafts 1 and 6 against axial movement. Such holding means act upon the respective shafts by way of the corresponding components of the torque transmitting unit 9.

The planar torque transmitting unit 9 occupies little room in the housing of the support and its component 8 is form-lockingly received in the cup-shaped element 10 which, in turn, is form-lockingly received in the recess 11a of the component 11. The components 8 and 11 compel the element 10 to move any point (X) of its annular portion 10a along a circular path with a diameter 2E in response to rotation of the shaft 6 about its axis. It has been found that the friction between the element 10 and the components 8 and 11 can be readily reduced to a value at which the torsional stresses upon the bellows 3 are minimal so that the improved assembly can be used for extended periods of time. Extensive experiments prove that the bellows can stand hundreds of thousands of angular displacements of the driving shaft (e.g., through angles of 90 degrees). In fact, the torsional stresses upon the bellows are so small that the twisting (if any) of the bellows cannot be detected with the naked eye when the assembly is in actual use.

The improved assembly exhibits the important advantage that the direction of transmission of torque can be reversed at any time and does not necessitate any changes in the construction of the assembly. Thus, the shaft 1 can be rotated by the components 8, in response to rotation of the shaft 6, and the shaft 6 can be rotated by the shaft 1 through the medium of the components 11, 8.

An advantage of a self-contained assembly is that it can be readily installed in existing fluid flow machines, valves and/or other systems wherein the driving and driven members should be hermetically sealed from each other.

Figure 6:
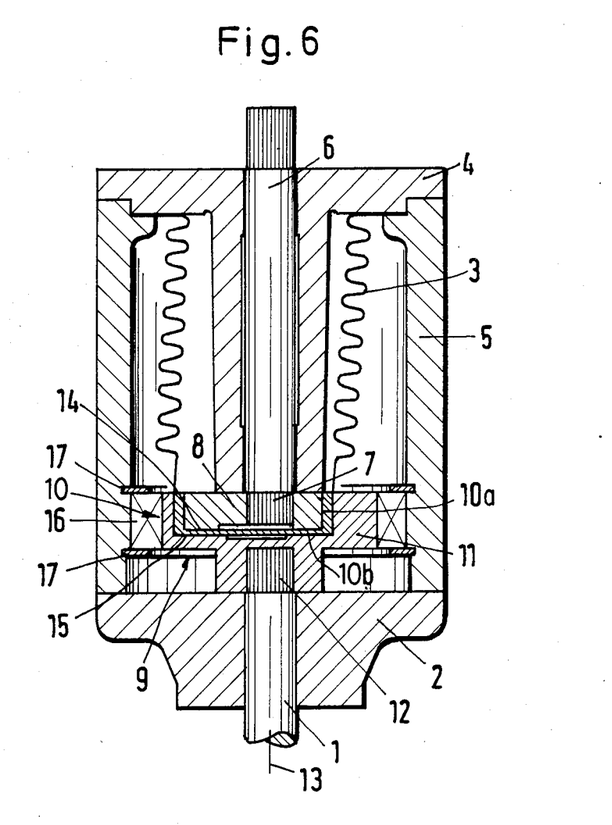
FIG. 6 is an axial sectional view of a modified assembly wherein one component of the torque transmitting unit rotates in a radial bearing which is mounted in the housing.

FIG. 6 shows a slightly modified assembly. All such parts which are identical with or clearly analogous to the corresponding parts of the assembly of FIGS. 1 to 5 are denoted by similar reference characters. The component 11 of the torque transmitting unit 9 has a smooth surface 15 which is normal to the common axis 13 of the shafts 1, 6 and is in sliding contact with the wall 10b of the cup-shaped element 10 of the sealing means. Such sealing means further includes the carrier means (bellows 3) and the support including the housing 2, 4, 5. A second smooth surface 14 is provided on the component 8 and is in contact with the other side of the wall 10b. Those portions of the components 11 and 8 which are adjacent to the respective surfaces 15, 14 can be said to constitute thrust bearings for the wall 10b of the cup-shaped element 10, and the surfaces 14, 15 ensure that the bellows 3 is subjected to negligible torsional stresses since the friction between the element 10 and the components 8, 11 of the torque transmitting unit is minimal.

The peripheral surface of the component 11 is surrounded by a radial antifriction (ball or roller) bearing 16 which is held in a selected axial position by two annular stops 17, e.g., by two split rings or washers extending into grooves which are machined into the internal surface of the tubular portion 5. The illustrated antifriction bearing 16 can be replaced with two or more antifriction bearings or with one or more friction bearings without departing from the spirit of the invention. One of the removable stops 17 can be replaced with an internal shoulder (i.e., with an integral part) of the tubular portion 5. Furthermore, the lower stop 17 of FIG. 6 can be omitted.

The bearing 16 is inserted into the tubular portion 5 from below, as viewed in FIG. 6, i.e., before the tubular portion 5 is welded or otherwise sealingly secured to the end wall 2. Such bearing is located in the plane (extending at right angles to the axis 13) in which the component 8 transmits torque to the component 11 when the shaft 6 is rotated by a motor or by hand.

The bearing 16 or an equivalent or analogous bearing or a set of two or more bearings will be used when the assembly is called upon to transmit large forces. Such bearing or bearings prevent any uncontrolled radial displacements of the components 8, 11 and thus any flexing of the shafts 1 and 6. If the bearing 16 is a combined radial and thrust bearing or if such bearing is replaced by or is used jointly with a thrust bearing, the components 8, 11 of the torque transmitting unit 9 (and hence the shafts 1 and 6 and the parts 10 and 3 of the sealing means) are even less likely to undergo extensive stresses which could lead to destruction of the bellows and eventual leakage of a confined fluid into the atmosphere and/or penetration of atmospheric air into an evacuated chamber. One or more simple radial bearings will be used when the unit 9 is not subjected to any or is subjected to negligible axial stresses. Needle bearings are preferred when the dimensions of the assembly (as considered in the radial direction of the shafts 1 and 6) are to be kept to a minimum. The assembly can be equipped with one or more commercially available axial and/or radial bearings. The placing of a bearing into or close to the plane in which the components 8 and 11 of the unit 9 transmit torque to each other is advantageous because this even further reduces the likelihood of bending of the shaft 1 and/or 6 while one of these shafts drives the other shaft. The bearing or bearings which are disposed in or close to such plane can transmit radial forces directly to the housing, i.e., to the tubular portion 5 of the illustrated housing. The provision of one or more radial bearings further contributes to a reduction or complete elimination of noise when the assembly is in use. Still further, such bearing or bearings reduce the stresses which are transmitted to the bellows 3.

Figure 7:
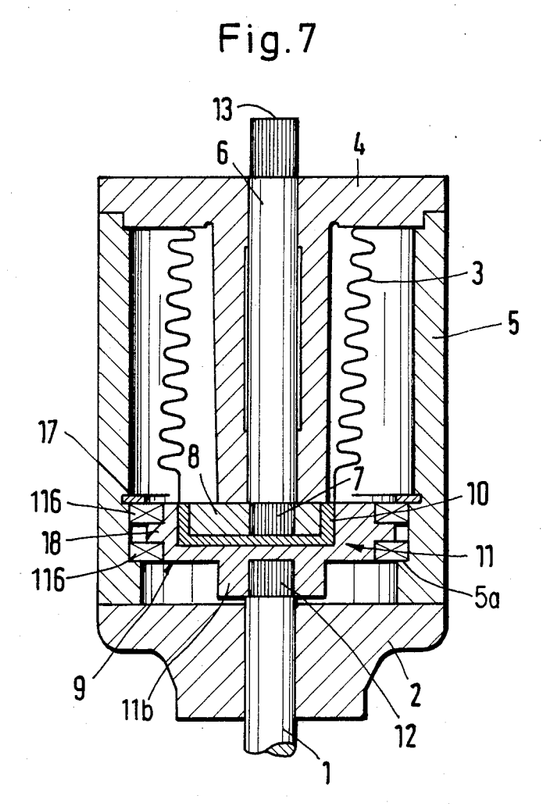
FIG. 7 is a similar axial sectional view of a third assembly wherein one component of the torque transmitting unit is mounted in two combined radial and thrust bearings.

FIG. 7 shows a third motion transmitting assembly wherein the peripheral surface of the component 11 is provided with a radially outwardly extending collar 18 which is flanked by two radial, axial or combined radial and thrust bearings 116 of any suitable design. The lower bearing 116 of FIG. 7 is disposed between the collar 18 and an internal shoulder or stop 5a of the tubular portion 5, and the upper bearing 116 of FIG. 7 is disposed between the collar 18 and a stop 17 which is recessed into the internal surface of the portion 5. The hub 11b of the component 11 is out of contact with the end wall 2. The bearings 116 cooperate with the collar 18, with the removable stop 17 and with the fixedly installed stop (internal shoulder 5a) to locate the component 11 of the torque transmitting unit 9 in a preselected axial position in the interior of the housing including the end walls 2, 4 and the tubular portion 5. The stop 17 and the internal shoulder 5a transmit axial stresses directly to the tubular portion 5 of the housing. The bearings 116 are installed in the tubular portion 5 before the latter is connected with the end wall 2.

The assembly of FIG. 7 can be used with advantage in or with machines wherein the machine part which is connected to the shaft 1 (and hence to the component 11 of the unit 9) is called upon to take or transmit axial stresses.

Figure 8:
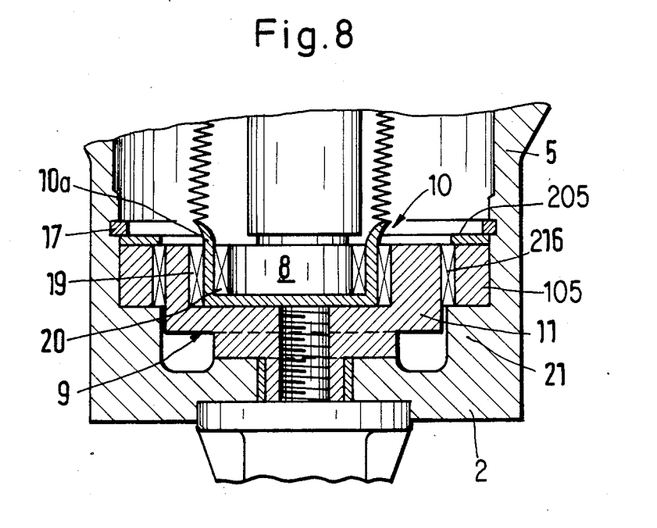
FIG. 8 is a fragmentary axial sectional view of a fourth assembly which constitutes a modification of the assembly of FIG. 6 and wherein the annular portion of the cup-shaped element of the sealing means is disposed between two coaxial needle bearings.

Referring now to FIG. 8, there is shown a portion of a fourth motion transmitting assembly with the torque transmitting unit 9 and portions of the housing and sealing means drawn to a larger scale. The component 11 of the unit 9 is surrounded by a needle bearing 216 which, in turn, is surrounded by a ring 105 adjacent to an internal shoulder 21 of an end wall 2 which is integral with the tubular portion 5 of the housing. The ring 105 is held against axial movement away from the shoulder 21 by a washer 205 which cooperates with a split ring constituting an axial stop 17.

The assembly of FIG. 8 further comprises two additional needle bearings 19 and 20 one of which surrounds the annular portion 10a of the cup-shaped element 10 and the other of which is surrounded by such annular portion. The bearings 19 and 20 contribute to a reduction of friction between the element 10 and the components 8, 11 of the torque transmitting unit 9. Such friction can be reduced still further if the components 8 and 11 are respectively provided with smooth surfaces 14 and 15 as described in connection with FIG. 6.

The assembly of FIG. 8 can be used with advantage in machines wherein the unit 9 is not or should not be subjected to any axial stresses. Such assembly can be built directly into a machine.

The needle bearing 19, 20 and/or 216 can be replaced with a ball bearing and/or with a friction bearing, depending on the availability of space for such bearings in the housing and/or on the extent to which friction between the element 10 and the components 8, 11 is to be reduced.

The bearing or bearings between the component 11 and the housing and/or between the element 10 and the component 8 and/or 11 render it possible to employ the improved assembly for transmission of large forces without expensive transmissions.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A motion transmitting assembly, comprising a rotary driving member having an end portion; a rotary driven member coaxial with and having an end portion adjacent to the end portion of said driving member; a torque transmitting unit including a first component affixed to one of said end portions and having a circular recess facing the other of said end portions and being eccentric with reference to the common axis of said members, and a second component having a circular outline eccentrically affixed to said other end portion and extending into said recess; and means for hermetically sealing said members from each other, including a substantially cup-shaped element disposed in said recess intermediate said components, a support, and deformable carrier means secured to said support and sealingly connected with said element, said components being rotatable relative to said element.

2. The assembly of claim 1, wherein said support includes a housing which confines said unit, said element and said carrier means, said end portions being rotatably journalled in said housing so that said assembly constitutes a self-contained unit.

3. The assembly of claim 1, further comprising means for holding at least one of said members against axial movement with reference to said support.

4. The assembly of claim 3, wherein said holding means is interposed between said support and at least one of said components.

5. The assembly of claim 4, wherein said holding means includes a portion which is integral with said support.

6. The assembly of claim 1, further comprising at least one radial bearing interposed between said support and said unit.

7. The assembly of claim 6, wherein said bearing surrounds said first component.

8. The assembly of claim 1, further comprising at least one thrust bearing interposed between said support and said unit.

9. The assembly of claim 8, wherein said bearing surrounds said first component.

10. The assembly of claim 1, wherein said unit is arranged to transmit torque in a predetermined plane which is normal to the common axis of said members, and further comprising at least one bearing interposed between said unit and said support in or close to said plane.

11. The assembly of claim 1, wherein said first component has a circumferentially extending annular collar and said support includes a housing spacedly surrounding said collar, and further comprising at least one bearing interposed between said housing and said unit and adjacent to said collar.

12. The assembly of claim 11, wherein said bearing is a radial bearing.

13. The assembly of claim 11, wherein said bearing is a thrust bearing.

14. The assembly of claim 1, wherein said first component has a smooth first surface bounding a portion of said recess and disposed at right angles to the common axis of said members, said second component having a smooth second surface spaced apart from and parallel to said first surface and said element having a wall between said surfaces.

15. The assembly of claim 1, wherein said element has a wall extending at right angles to the common axis of said members and having smooth first and second surfaces in sliding contact with the respective components of said unit.

16. The assembly of claim 1, wherein said support includes a housing having first and second end walls and said driving and driven members are respectively journalled in said first and second end walls so that their end portions are disposed in said housing, said carrier means including a deformable tube having a first end portion sealingly secured to said housing and a second end portion sealingly secured to said element.

17. The assembly of claim 16, wherein said tube is a bellows in said housing.

18. The assembly of claim 1, wherein said end portions have external teeth and said components have internal teeth mating with the external teeth of the respective end portions.

* * * * *